Figure 1:
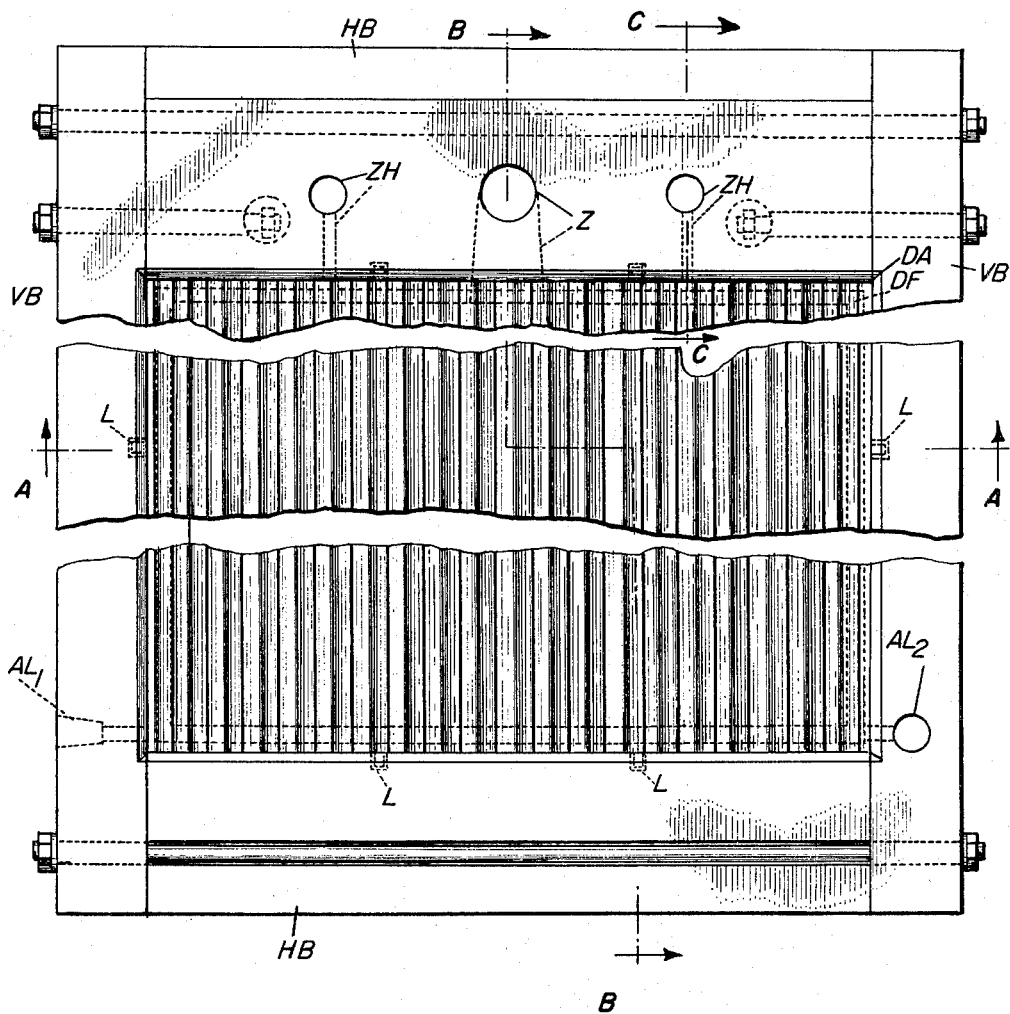

Oct. 3, 1961 J. VOGT 3,002,626
FILTER PRESS
Filed July 15, 1959 2 Sheets-Sheet 1

INVENTOR
Josef Vogt

BY Wenderoth, Lind & Ponack
ATTORNEYS

Oct. 3, 1961   J. VOGT   3,002,626
FILTER PRESS
Filed July 15, 1959   2 Sheets-Sheet 2
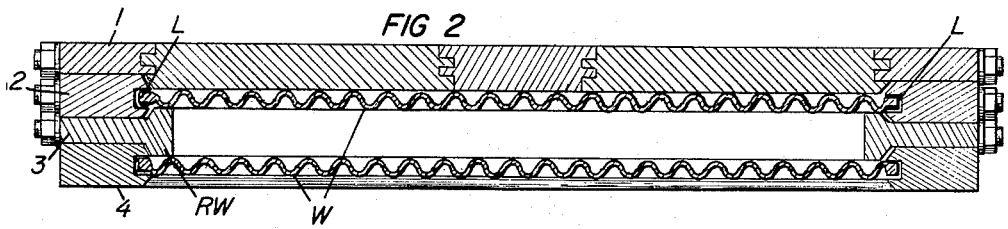
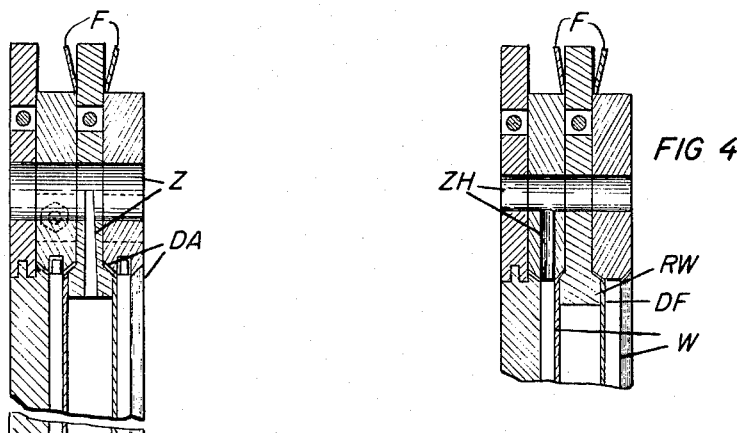
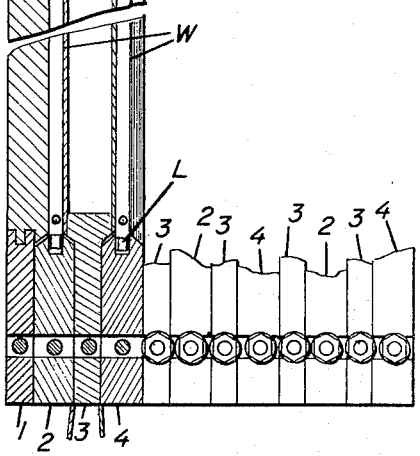
INVENTOR
Josef Vogt
BY Wenderoth, Lind & Ponack
ATTORNEYS

United States Patent Office 3,002,626
Patented Oct. 3, 1961

3,002,626
FILTER PRESS
Josef Vogt, Allschwil, Switzerland, assignor to
J. R. Geigy A.-G., Basel, Switzerland
Filed July 15, 1959, Ser. No. 827,249
Claims priority, application Switzerland July 16, 1958
1 Claim. (Cl. 210—228)

The present invention relates to an improved filter press.

Filter presses are known which comprise filter plates, distance pieces and filter cloths, the filter cloths being disposed on both sides of each filter plate, the outer edges thereof being clamped between adjacent filter plates and distance pieces.

When the filter plates have the same thickness throughout, the filter plates themselves represent a dead volume of about 50% of the filter press. In an attempt to increase the capacity of such filter presses, it has already been proposed to decrease the thickness of the central part of the filter plate. This can be achieved by forming the central part of the filter plate from wire gauze, corrugated iron, etc. Such plates have not, however, proved to be satisfactory, since no such models have appeared on the market.

Filter presses in which the central part of the filter plate is thinner than the frame of the filter plate have a number of disadvantages. The filter cloths which are disposed on either side of the filter plate are streched between the frame members of the filter plates and the distance pieces therebetween and do not initially lie against the central part of the filter plate. In operation, as the pressure increases within the press, the filter cloths are pressed increasingly against the central part of the filter plate, finally lying closely against the surface of the central part of the filter plate. The filter cloth is therefore stretched, especially at the centre, and this continuous stretching eventually causes a break in the filter cloth.

The central part of the filter plate, e.g. corrugated iron, etc. has hitherto been supported in grooves formed in the inner marginal edge of the frame member of the filter plate. The inner marginal edge of the frame is bevelled on both sides so that it forms a ridge leading from the sides of the frame to the filter plate. During use, the filter cloth presses against the bevelled edges, and after a time when the elasticity of the wooden frame has decreased owing to leaching, longitudinal cracks appear in the bevelled edges.

It has also been necessary, when using corrugated iron central parts, to employ a special insert piece disposed in the inlet bore of the filter plates to ensure that no material being filtered gets behind the filter cloths.

It is an object of the present invention to provide a filter press which allows for the use of filter plates having a thinner central portion but which avoids the disadvantages described above.

According to the present invention, a filter press is provided which comprises a plurality of filter plates and distance pieces, said distance pieces being disposed one between each pair of adjacent filter plates, said filter plates each comprising a filter plate frame having a centre plate the thickness of which is less than that of the filter plate frame, the inner marginal edge of said filter plates frames being bevelled at both sides, each of said distance pieces comprising a frame the inner marginal edge of which is thickened to form a shoulder at each side thereof, each of said shoulders having a bevelled edge adapted to co-operate with a bevelled edge of the filter plate frame adjacent thereto, the dimension of each shoulder in the direction of the thickness of said frame being equal to half the difference in thickness between a filter plate frame and its centre plate.

The frames of both the filter plates and the distance pieces are provided with co-axial holes in the upper horizontal limbs thereof so as to produce a continuous inlet bore running through the press for admission of slurry to be filtered, a channel being provided in each distance piece frame connecting the inlet bore with the interior of the press. The filter cloths are disposed on each side of the filter plates and are clamped between the frame members of the filter plates and distance pieces. Usual clamping means are provided for clamping the filter plates and distance pieces into position. Further co-axial holes may be provided in the said upper horizontal limbs to form further inlet bores for air and wash water, channels being provided in alternate filter plate frames connecting these further inlet bores to the interior of the press. One of the vertical limbs of each filter plate frame has an outlet boring communicating with the space between the filter cloths in the interior of the press. The other vertical limb of each filter plate frame has an internal boring connecting the space between the filter cloths and the interior of the press to an outlet channel formed by a series of co-axial holes formed in the vertical limbs of the distance piece frames and filter plate frames. The press can therefore be operated in an open or a closed manner.

Attachment and location means are provided for locating the central plates within the filter plate frames and attaching and locating the filter plates wtihin the filter plate frames. The attachment and location means may, for example, take the form of holes formed in the inner marginal edge of the filter plate frame which receives pins rigidly attached to or integral with the marginal edge of the central plate.

When the press of the invention is set up and the filter cloths are in position, clamping of the filter plates and distance pieces together causes the filter cloths to be pressed against the filter plates so that they lie closely against the filter plates before filtration is started. In this way, the pressure which builds up during filtration does not cause any strain to be inflicted on the filter cloths with its attendant disadvantages. Again, the shoulders of the thickened portion of the inner marginal edge of adjacent distance piece frames forms, together with the inner marginal edge of the filter plate frame lying therebetween, a groove or channel which receives the outer marginal edge of the centre plate of the filter plate. The damage hitherto occasioned by high pressure within the filter press is thus avoided, since there is no thin section of wood present which is liable to crack.

The invention will be further illustrated by reference to the accompanying drawings, in which:

FIG. 1 represents an elevation of a filter press according to the invention with the blind plate removed, FIG. 2 is a horizontal section along the lines A—A of FIG. 1 showing the blind plate in position, FIG. 3 is a vertical section along the line B—B of FIG. 1 showing the blind plate in position, FIG. 4 is a vertical section along the line C—C showing the blind plate in position.

In the drawings, 1 is a blind plate at the head of the press, 2 is a filter plate, 3 is a distance piece, 4 is a filter plate. Filter plates 2 and 4 differ in that filter plate 2 has channels connecting the inlet bores for air and water with the interior of the press, whereas filter plate 4 does not have these channels. HB are horizontal beams of the filter plate frames, VB are vertical beams of the filter plate frames, Z is the inlet bore and channel for the material to be filtered, ZH are inlet bores for auxiliary services such as washing liquids, compressed air, etc., $AL_1$ is an outlet bore for the filtrate of an open press, $AL_2$ is the outlet bore for the filtrate of a closed press, W is the central plate of a filter plate and in this case is of corrugated iron, L is the attachment and location means for attaching and locating the central plate, W within the frame of the filter plate, RW is the widened portion of the inner marginal edge of the distance piece frames, DA are the bevelled faces of the inner marginal edges of the filter plate frames and of the shoulders on the thickened portions of the inner marginal edge of the distance piece frames, DF is the central plate supporting surface of the shoulders of the said thickened portions of the distance piece frames.

Referring to the drawings, the filter plates (2 or 4) have a frame consisting of vertical limbs VB and horizontal limbs HB which are clamped together by conventional rods and nuts extending through channels provided in the vertical and horizontal limbs. The inner marginal edge of each limb (VB or HB) is bevelled (DA) on both sides to form a ridge. The frame can be made of any desired material, e.g. wood, iron or synthetic resin. It possesses the normal dimensions (e.g. thickness) of ordinary filter press plates used in filter presses for filtering materials with large quantities of solid materials. Holes Z are provided in the upper horizontal limb of each filter plate to provide an inlet for the slurry to be filtered. Further holes and channels ZH are provided in the upper horizontal limb for the inlet of wash water, compressed air, etc. The thickness of the frame must be such that the holes provided therein have a sufficient diameter and strength without endangering the robustness of the whole plate. A centre plate W is provided within each of the filter plate frames, holes being provided at the inner marginal edge of the vertical and horizontal limbs of the filter plate frame, and pins being provided at the outer marginal edge of the centre plate W which co-operate to provide the attachment and location means L for attaching and locating the centre plate W within the frame of the filter plate. The material from which centre plate W is constructed depends on the nature of the materials to be filtered, e.g. its corrosive properties or the relative amounts of solid and liquid material present in the feed slurry. Examples of suitable materials are stainless steel, rubber coated sheet iron, copper, brass, sheet iron coated with brass, hard rubber and synthetic substances. Preferably the centre plate W is corrugated.

If the filter plates are made of metal throughout, then the frame and centre plate can be integral one with the other, and no separate attaching and locating means is necessary.

The distance pieces 3 are also composed of vertical and horizontal limbs held together by conventional rods and nuts disposed in channels provided in the said limbs. The inner marginal edge of the vertical and horizontal limbs of the distance piece are provided with a thickened portion RW which forms a shoulder at each side thereof. One edge DA of each of the shoulders is bevelled so as to co-operate with a bevelled edge DA on the frame of the filter plate adjacent thereto. The dimension of each shoulder in the direction of the thickness of the distance piece frame is equal to half the difference in thickness between the filter plate frame and the center plate therein. Each of the shoulders has a face DF which forms one of the side walls of a channel into which the filter plate W of each filter plate projects, the base of the channel being formed by the ridge of the inner marginal edge of the filter plate frame. Inlet holes and channels are provided in each of the distance pieces which co-operate with the holes in the filter plate frames to form the inlet bore and channels for the slurry to be filtered. Holes ZH are also provided in the upper horizontal limb of the distance piece frame which co-operate with corresponding holes in the filter plate frames to form the inlet bore for water, compressed air, etc.

Filter cloths F of any suitable construction shown in FIG. 2 are disposed one on each side of each filter plate and are clamped between adjacent filter plates frames and distance piece frames. The filter cloths F are provided with holes which correspond with the inlets Z and ZH. Blind plates are provided at each end of the press to complete the frame work of the press.

An outlet $AL_1$ is provided in one of the vertical limbs of each filter plate (2 or 4), the outlet communicating on the one hand with the exterior of the filter plate frame, and on the other hand with the space between the filter cloths F on the other side of the filter plate within the filter press. This outlet may be used when the press is used as an open press. A further outlet $AL_2$ is provided in the other vertical limb of each filter plate frame which consists of a boring extending through each of the vertical limbs of both the filter plate frames and the distance piece frames and channels connecting the spaces between the filter cloths on either side of the filter plate within the press to said boring. This outlet is used when the press is used as a closed press.

What is claimed is:

A filter press comprising a plurality of filter plates, each filter plate having a frame and an imperforate center plate having an irregular surface on both sides thereof providing flow passages to the edges of said center plate, said center plate having a thickness less than the thickness of the frame and being mounted in the frame, and said filter plates each having a filter cloth over each face of the center plate and extending over the faces of the frame, and a plurality of distance pieces being disposed one between each pair of adjacent filter plates and clamping the filter cloths against the filter plate frames, the inner marginal edge of said filter plate frames being bevelled at both sides and around the entire internal periphery thereof, each of said distance pieces comprising a frame the inner marginal edge of which is thickened around the entire internal periphery thereof to form a shoulder at each side thereof, each of said shoulders having a bevelled edge adapted to cooperate with the bevelled edge of the filter plate frame adjacent thereto and clamping the filter cloth therebetween against the bevelled edge of the adjacent filter plate frame, the dimension of each shoulder in the direction of the thickness of said distance piece frames being equal to half the difference in thickness between a filter plate frame and the center plate therein, and the portion of the filter cloths within the filter plate frames being held flat against the center plates by the distance pieces.

References Cited in the file of this patent

UNITED STATES PATENTS

| | | |
|---|---|---|
| 614,619 | O'Hanlon | Nov. 22, 1898 |
| 707,245 | Locke | Aug. 19, 1902 |
| 872,008 | Von Oven | Nov. 26, 1907 |
| 1,887,798 | Bryant | Nov. 15, 1932 |
| 2,761,567 | Fisher | Sept. 4, 1956 |

FOREIGN PATENTS

| | | |
|---|---|---|
| 5,973 | Great Britain | May 19, 1894 |
| 70,356 | Austria | Nov. 10, 1915 |
| 408,963 | France | Feb. 5, 1910 |